(12) United States Patent
Chang et al.

(10) Patent No.: US 8,313,026 B2
(45) Date of Patent: Nov. 20, 2012

(54) RADIO FREQUENCY IDENTIFICATION CHIP AND SETTING AND OPERATING METHODS OF SAME

(75) Inventors: Wei Chang, Hsinchu (TW); Chi-Han Lan, Taipei (TW); Hsu-Hung Chang, Taichung (TW); Chien-Hsing Lin, Taichung (TW)

(73) Assignee: Mstar Semiconductor, Inc., Hsinchu hsien (TW)

( * ) Notice: Subject to any disclaimer, the term of this patent is extended or adjusted under 35 U.S.C. 154(b) by 701 days.

(21) Appl. No.: 11/868,121

(22) Filed: Oct. 5, 2007

(65) Prior Publication Data
US 2008/0083832 A1  Apr. 10, 2008

(30) Foreign Application Priority Data
Oct. 5, 2006  (TW) ................................ 95137196 A (51) Int. Cl.
*G06F 19/00* (2011.01)
(52) U.S. Cl. ........................ 235/385; 235/493
(58) Field of Classification Search .................. 235/385, 235/493; 340/10.1, 10.31, 10.4, 10.41, 10.5
See application file for complete search history.

(56) References Cited

U.S. PATENT DOCUMENTS

| | | | |
|---|---|---|---|
| 7,135,977 B2 * | 11/2006 | Burg et al. | 340/572.1 |
| 7,245,213 B1 * | 7/2007 | Esterberg et al. | 340/539.12 |
| 2004/0025035 A1 * | 2/2004 | Jean-Claude et al. | 713/189 |

OTHER PUBLICATIONS

Philips Semiconductor, HITAG S Product Specification, Jul. 18, 2006, Revision 3.1.*

* cited by examiner

*Primary Examiner* — Kristy A Haupt
(74) *Attorney, Agent, or Firm* — Kirton McConkie; Evan R. Witt (57) ABSTRACT

An RFID chip is modified with set data before being disposed in an electronic label so as to allow the electronic label to be selectively used with different types of RFID systems. The RFID chip includes a first data storage zone for storing first data set accessible by the first type of RFID system and the second type of RFID system; and a second data storage zone for storing second data set inaccessible by the first type of RFID system and the second type of RFID system. The second data set includes a modifiable code for indicating a type of the electronic label and with which of the first type of RFID system and the second type of RFID system the electronic label is to be used.

17 Claims, 8 Drawing Sheets

RADIO FREQUENCY IDENTIFICATION CHIP AND SETTING AND OPERATING METHODS OF SAME

FIELD OF THE INVENTION

The present invention relates to an RFID (radio frequency identification) chip, and more particularly to an RFID chip adapted to various RFID systems. The present invention also relates to a setting method and an operating method of an RFID chip to be selectively used with different RFID systems.

BACKGROUND OF THE INVENTION

Barcodes are commonly used in markets. By scanning the alternate black and white stripes with different widths in each barcode, the barcodes can be differentiated so as to identify goods or objects. The barcode is scanned with a barcode reader which performs optical-to-electronic conversion of the stripes, thereby realizing specific data carried by the barcode. The specific data, for example, may be used for product management, consumption monitoring, stock filing, etc. Nevertheless, data contents and size carried by a barcode are limited and unsatisfactory for advanced uses. Moreover, a user has to scan respective barcodes one by one with a barcode reader when a number of goods or objects are to be identified. It is apparently time-inefficient.

For advanced applications, RFID (Radio Frequency Identification) techniques are developed along with the enhancement of IC designs, semiconductor manufacturing processes and wireless communication techniques. An RFID electronic label is a tiny chip optionally recorded therein detailed information of products or objects. The data recorded in the chip can be transmitted wirelessly to be received and verified by a remote reader. Since the data transmission between the RFID electronic label and the reader is implemented wirelessly. It is some kind of non-contact sensing and identifying technique. Therefore, the effective access range of an RFID electronic label depends on the signal power of the reader.

Figure 1:
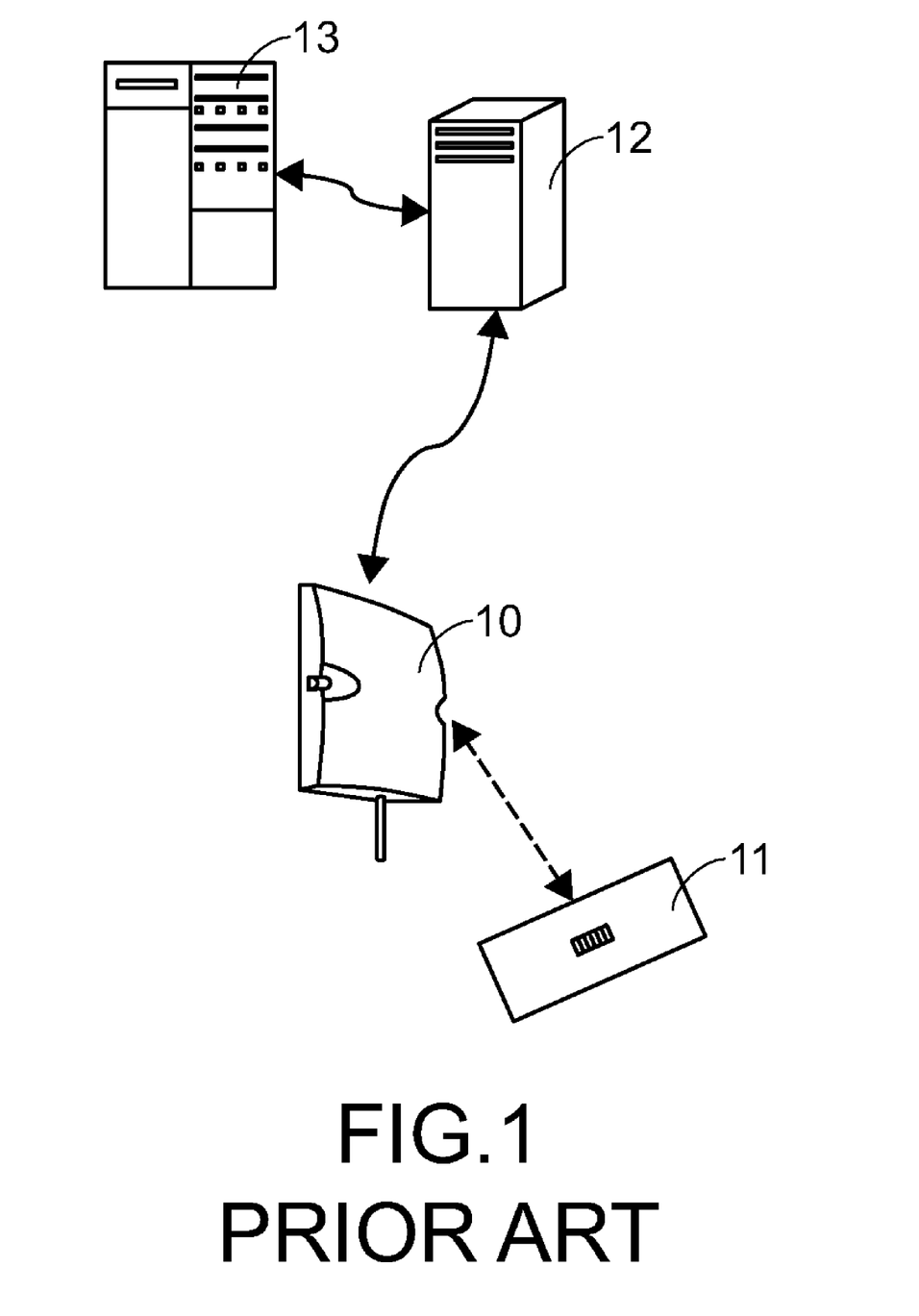
FIG. 1 is a schematic diagram illustrating means for identifying an RFID label according to prior art.

Please refer to FIG. 1, in which a reader 10 and an RFID electronic label 11 are illustrated. For wirelessly reading information contained in the RFID electronic label 11, the RFID electronic label 11 should lie in a range accessible by the reader 10. After obtaining data from the RFID electronic label 11, the reader 10 passes the data to a remote server 12 linking thereto to have the data checked and verified according to a database 13. Due to the wireless transmission feature, it is unnecessary to scan the products or objects piece by piece any more. Instead, the information of all the products or objects lying in the accessible range can be read at the same time so as to save time and laboring.

In addition, an RFID electronic label system exhibits a variety of advantages. For example, stock can be strictly controlled, logistics can be well managed, cashier efficiency can be raised, consuming behaviors can be readily collected and analyzed. Therefore, it is applicable to a variety of work procedures such as cargo delivery, vehicle maintenance, electronic charge, etc.

For preventing from identifying errors and rejecting fake labels, the reading operation of an RFID electronic label involves a critical checking and verifying process. Currently, there are two means for identifying an RFID electronic label. One directs to a closed system and the other directs to an open system. A closed RFID system is applicable to a highly secured system such as an entrance guard system or a mass transportation system. When an article or an object with an RFID electronic label passes the accessible range of a reader, the reader sends a pin code to the RFID electronic label by way of a wireless signal with a specified communication format. After the RFID electronic label receives the pin code, it checks if the received pin code conforms to the one stored therein. Once the pin code is verified, the RFID electronic label is allowed to send the requested data to the reader. As the above-mentioned pin code is transmitted under an encryption state, a decryption operation is required for the RFID electronic label to extract the pin code so as to secure the verification process. Generally, the reader in the closed RFID system is under well protection.

On the other hand, the open RFID system is applicable to publicly available articles or commercial products. Since these articles or products need be transferred among various stations, e.g. factories, logistic centers, retailers, etc., an RFID electronic label is required to be identifiable by readers of those stations. Furthermore, the reading operation of the RFID electronic label has to be fast and efficient. As a result, it is hard to strictly control the data safety. One possible way to verify the RFID electronic label is to link the readers to an information system (e.g. the backend remote server 12 and database 13 of FIG. 1) via Internet so that specific information, e.g. name of manufacturer, manufacturing place or producing date and time, read from the RFID electronic label can be checked according to the data recorded in the information system.

Security is critical to a closed RFID system, while efficiency is a key factor for an open RFID system. Due to the different requirements, electronic labels generally used in these two systems are different in design concepts. In other words, these two kinds of labels have to be produced by different specifications of production lines. As a result, the production cost is increased. Furthermore, the label-verifying information applicable to an open RFID system is generally recorded into the labels by the label users. It is highly risky that others might easily copy or alter the information so as to cause loss of products or money.

SUMMARY OF THE INVENTION

Therefore, the present invention provides an RFID chip adapted to various RFID systems.

The present invention also provides a setting method of an RFID chip to enable the use with a specified one of various RFID systems.

The present invention further provides an operating method of an RFID chip adjusted depending on a set data of the RFID chip.

In an embodiment, the present invention provides an RFID (radio frequency identification) chip to be disposed in an electronic label. The RFID chip is modifiable to allow the electronic label to be selectively used with a first type of RFID system or a second type of RFID system. The RFID chip includes a first data storage zone for storing first data set accessible by the first type of RFID system and the second type of RFID system; and a second data storage zone for storing second data set inaccessible by the first type of RFID system and the second type of RFID system; wherein the second data set includes a modifiable code for indicating with which of the first type of RFID system and the second type of RFID system the electronic label is to be used.

In an embodiment, the RFID chip further comprises a first circuit for communicating with the first type of RFID system; a second circuit for communicating with the second type of RFID system; and a discriminating circuit for actuating one of the first type of RFID system and the second type of RFID system according to the modifiable code included in the second data set.

In an embodiment, the RFID chip further comprises a calculating circuit for obtaining a checking code according to a first data included in the first data set, a second data included in the second data set.

According to another aspect of the present invention, a setting method of an RFID chip to be disposed in an electronic label which is selectively used with a first type of RFID system or a second type of RFID system. The setting method comprises: storing a first data set in a first data storage zone of the RFID chip, wherein the first data storage is accessible by the first type of RFID system and the second type of RFID system; storing a second data set in a second data storage zone of the RFID chip, wherein the second data storage zone is inaccessible by the first type of RFID system and the second type of RFID system; and modifying a modifiable code included in the second data set depending on which type of RFID system the electronic label is to be used with.

In an embodiment, a second code included in the second data set is modified depending on whether an identification procedure of the electronic label is to be executed by the RFID chip or the RFID system the electronic label is to be used with.

A further aspect of the present invention relates to an operating method of an RFID chip to be disposed in an electronic label, which includes referring to a security code stored in a secured data storage zone of the RFID chip; selectively actuating a first circuit of the RFID chip when the security code indicates the RFID chip is to be used with a first type of RFID system; and selectively actuating a second circuit of the RFID chip when the security code indicates the RFID chip is to be used with a second type of RFID system.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
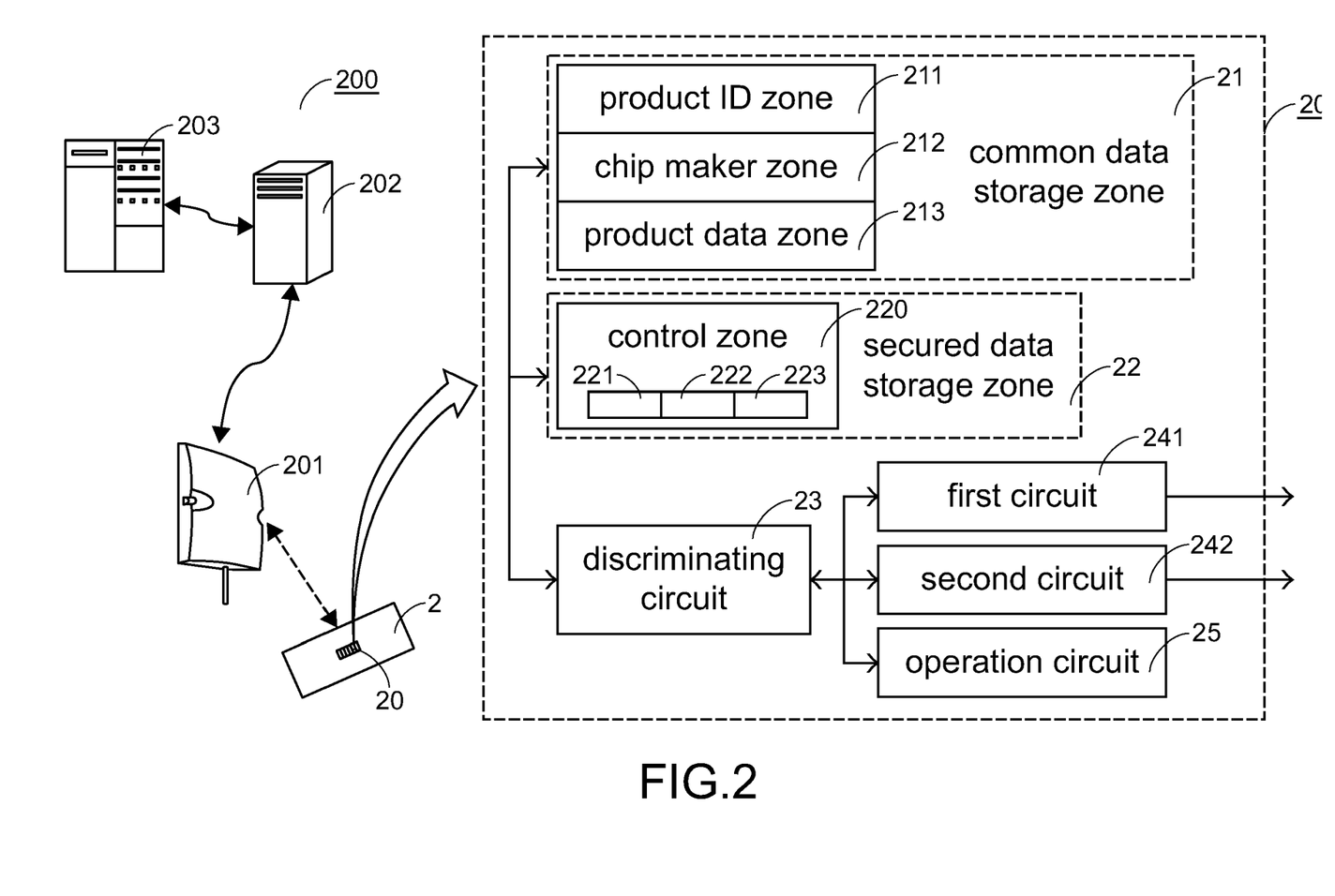
FIG. 2 is a schematic diagram illustrating means for identifying an RFID label according to an embodiment of the present invention.

Please refer to FIG. 2, which is a schematic diagram showing means for identifying an electronic label according to an embodiment of the present invention, including an RFID chip and an RFID system with which the electronic label is currently used (hereinafter, "the current RFID system"). The current RFID system 200 includes a reader 201, a remote server 202 and a database 203 linking to one another via cables, wireless signals or internet for communicating with an RFID chip 20 embedded in an electronic label 2 in a wireless manner when the RFID electronic label 2 lies within a range accessible by the reader 201. The reader 201 exchanges data with the RFID chip 20, and the remote server 202 searches data in the database 203 or accesses data from the database when required.

In the RFID chip 20, a memory device is disposed and includes a data storage zone 21 accessible by a common RFID system or a common reader and a data storage zone 22 secured from access by a common RFID system or a common reader. The data storage zone 21 includes a product ID zone 211, a chip maker zone 212 and a product data zone 213. The data storage zone 22 includes a control zone 220. The product ID zone 211 is provided for a product maker to record a product ID, i.e. a code specifically representing a product where the electronic label 2 is attached. The chip maker zone 212 is a read-only memory zone in which data are written in advance by a chip maker and cannot be modified or changed. The data, for example, include a tag series ID that is a code specifically representing the chip and/or a remote server IP provided by the product maker. The product data zone 213 allows the product maker to write therein a variety of information associated with the product where the electronic label 2 is attached, e.g. name, price, producing date and/or producing place of the product. On the other hand, the control zone 220 records therein a security code 221 consisting of one bit in this embodiment, a direction code 222 consisting of one bit in this embodiment, and a calculation code 223 consisting of plural bits in this embodiment. The control zone 220 is a zone hidden from free access so that the security code 221, direction code 222 and calculation code 223 cannot be set or changed by the product maker or seller.

The RFID chip 20 further includes a first circuit 241, a second circuit 242 and a discriminating circuit 23. The first circuit 241 and the second circuit 242 are selectively actuated by the discriminating circuit for working with different RFID systems such as an open RFID system and a closed RFID system, respectively. The discriminating circuit 23 determines which of the first circuit 241 and the second circuit 242 to be actuated according to the security code 221 recorded in the control zone 220. For example, if the electronic label 2 with the RFID chip 20 is to be used in an open system that does not require a high security level, the chip maker will set the security code 221 in the control zone 220 of the RFID chip 20 to be "0" in order that the RFID electronic label 2 can be identifiable by readers of various stations including factories, logistic centers, retailers, etc. according to a common communication protocol. Under this circumstance, the direction code 222 and calculation code 223 in the control zone 220 of the RFID chip 20 are disregarded. Detecting that the security code is "0", the discriminating circuit 23 actuates the first circuit 241 to accomplish the data transmission and identification required for an open RFID system. On the other hand, if the electronic label 2 with the RFID chip 20 is to be used in a closed system that requires a high security level, the chip maker will set the security code 221 in the control zone 220 of the RFID chip 20 to be "1". Meanwhile, the direction code 222 and calculation code 223 in the control zone 220 of the RFID chip 20 are additionally checked. Then the discriminating circuit 23 actuates the second circuit 242 to accomplish the data transmission and identification required for a closed RFID system. In this way, with the same RFID chip modified with different security codes, the RFID chip can be selectively used with an open RFID system or a closed RFID system.

Even with the same security code 221 to be used in a closed system, the RFID chip can be further modified to be used in different closed systems by differentially setting the direction code 222. The direction code 222 is used to indicate whether the identification procedure of the electronic label is to be performed by the reader 201 of the current RFID system 200 or the discriminating circuit 23 of the RFID chip 20. For example, the direction code "0" indicates that the identification procedure of the electronic label is to be performed by the discriminating circuit 23 of the RFID chip 20, e.g. payment cards, electronic tickets, etc., while direction code "1" indicates that the identification procedure of the electronic label is to be performed by the reader 201 of the current RFID system 200, e.g. entrance-guarding card readers, safe-unlocking card readers, etc. In order that the identification procedure of the electronic label can be performed by the discriminating circuit 23, identification-related data should be transmitted from the current RFID system 200 to the RFID chip 20 wirelessly. On the other hand, in order that the identification procedure of the electronic label can be performed by the reader 201, identification-related data should be transmitted from the RFID chip 20 to the current RFID system 200 wirelessly.

The identification-related data mentioned above includes the product ID and/or tag series ID, and additionally, a checking code. For further assuring of security in a closed system, a primitive checking code is previously generated and stored in a database of an RFID system with which the electronic label is to be used (hereinafter, "the associated RFID system") during the production of the RFID chip 20. On the other hand, an identifying checking code is generated by a calculating circuit 25 of the RFID chip 20 during the identification procedure of the electronic label 2. The generation of the primitive checking code and the identifying checking code for the same RFID chip are both performed by the calculating circuit 25 based on a specific operating formula. First of all, a random value is generated according to the calculation code 223. The random value is then operated with the product ID or tag series ID by the calculating circuit 25 to obtain the primitive checking code or the identifying checking code. The primitive checking code is stored in the database of the associated RFID system in advance as well as the product ID and tag series ID. Afterwards, when an identification procedure is performed, an identifying checking code is generated and compared with the previously stored primitive checking code. If the two checking codes comply with each other under a specified product ID or tag series ID, the electronic label is successfully identified.

Figure 3:
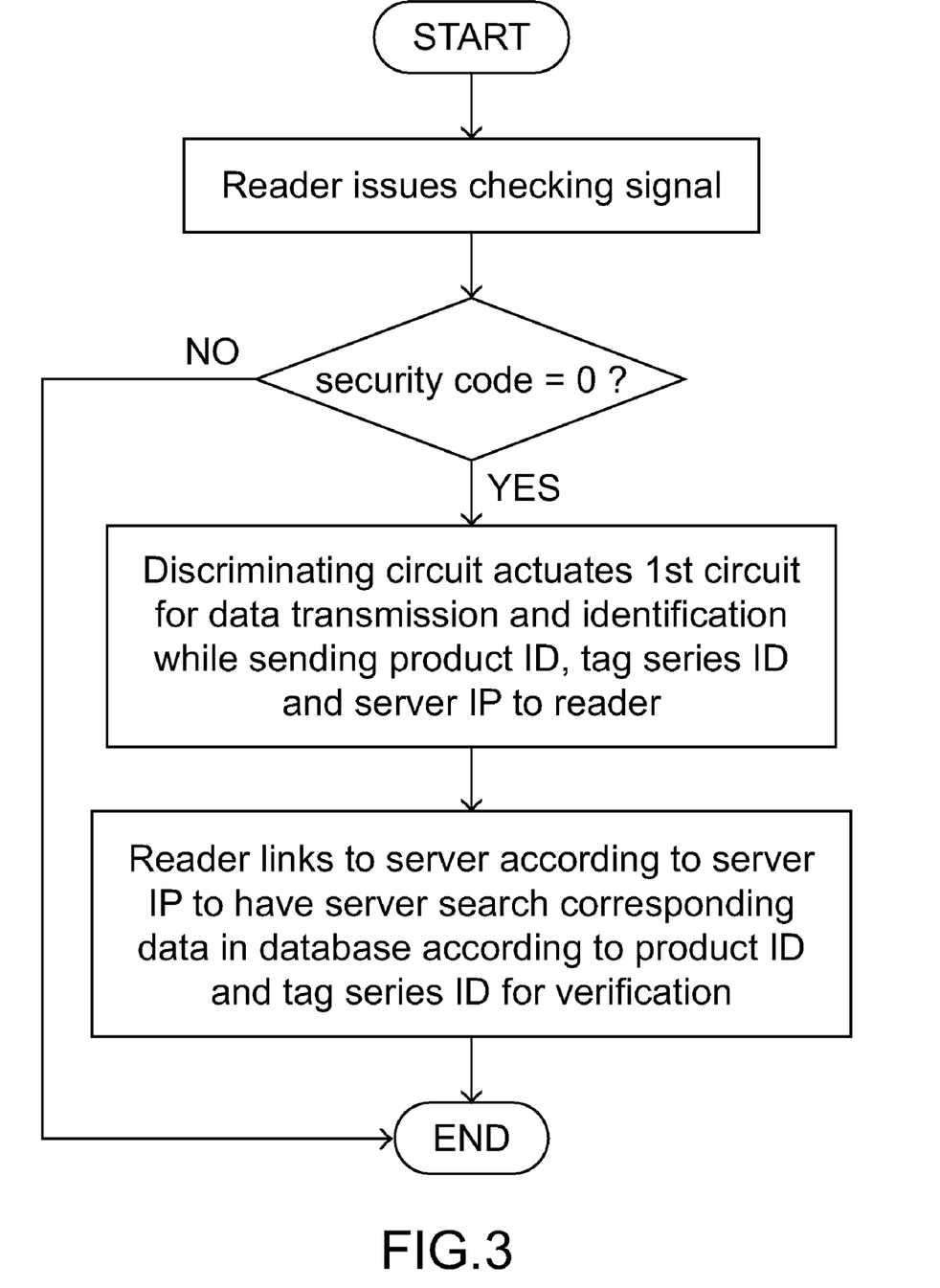
FIG. 3 is a flowchart illustrating an operating method of an RFID chip with an RFID system of FIG. 3 according to an embodiment of the present invention.

Hereinafter, the operations of RFID chips in an open system and a closed system are respectively illustrated with reference to the flowcharts of FIGS. 3~5.

An identification procedure of an electronic label according to a first embodiment of the present invention is illustrated with reference to the flowchart of FIG. 3. It is to be noted that before the identification procedure is performed, product ID as that stored in the product ID zone and tag series ID as that stored in the read-only chip maker zone of the RFID chip are stored into a database of the associated RF system in advance. Afterwards, when the electronic label is used with an open RFID system, the identification procedure as illustrated in FIG. 3 is performed. In response to a checking signal issued by a reader of the current RFID system, the discriminating circuit checks the security code of the RFID chip. If the security code is "0", it indicates that the present RFID chip is to be used with an open RFID system. Accordingly, the discriminating circuit actuates the first circuit for data transmission and identification. Meanwhile, the discriminating circuit transmits product ID, tag series ID and server IP to the reader. The reader links to the remote server according to the server IP recorded in the electronic label. The remote server then searches the database to confirm whether the product ID and tag series ID recorded in the electronic label are correct and really exists. If yes, the identification of the electronic label is completed. Since the server IP and tag series ID are given by chip maker as read-only data, the identification of the electronic label involving these data are quite reliable.

Figure 4:
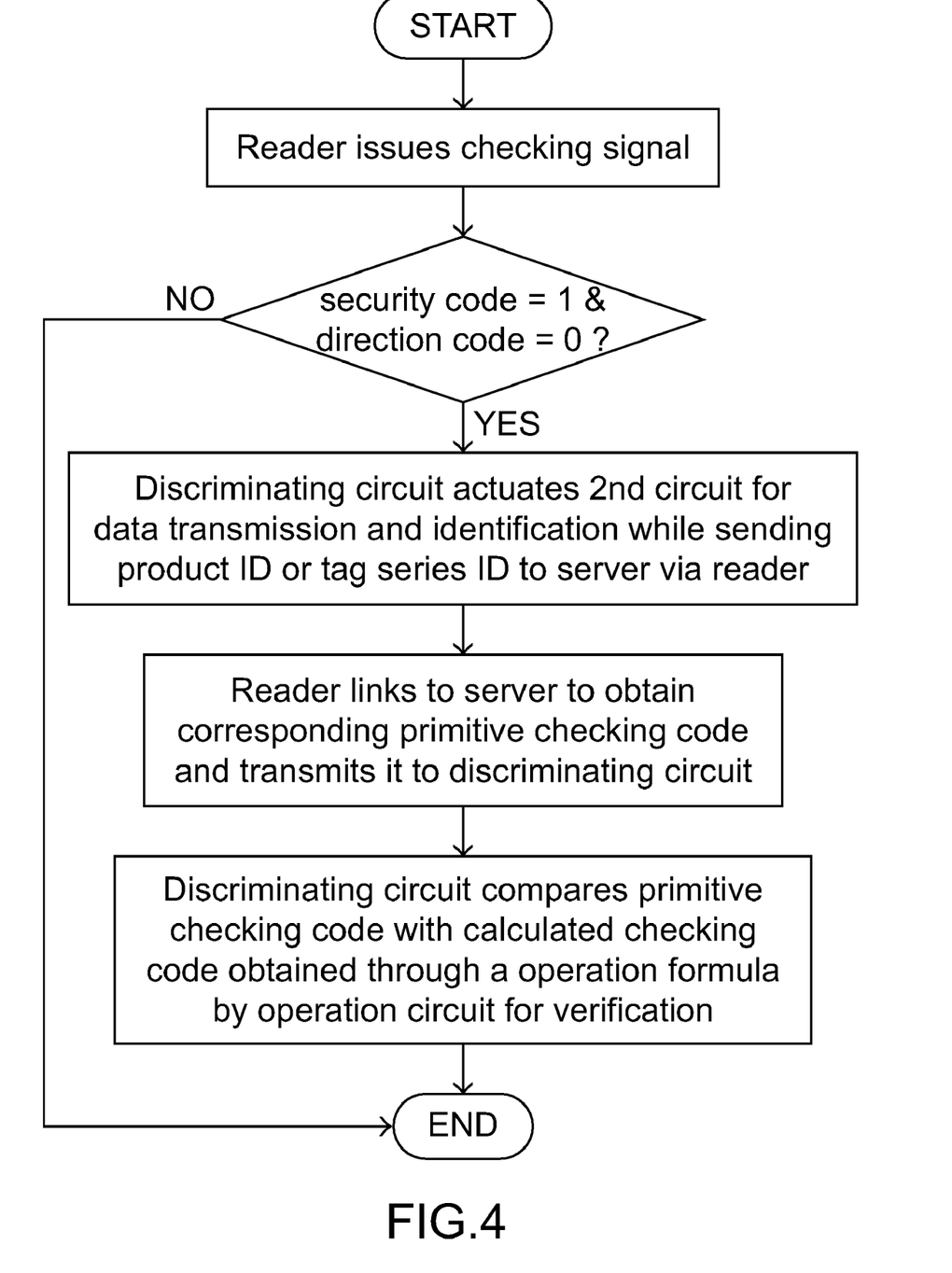
FIG. 4 is a flowchart illustrating an operating method of an RFID chip with an RFID system of FIG. 3 according to another embodiment of the present invention.

FIG. 4 illustrates an identification procedure of an electronic label according to a second embodiment of the present invention. Likewise, before the identification procedure is performed, product ID as that stored in the product ID zone or tag series ID as that stored in the read-only chip maker zone of the RFID chip are stored into a database of the associated RFID system in advance. In addition, the primitive checking code is also generated and stored into the database. When the electronic label is used with a closed RFID system, the identification procedure as illustrated in FIG. 4 is performed. In response to a checking signal issued by a reader of the current RFID system, the discriminating circuit checks the security code and direction code of the RFID chip. If the security code is "1" and the direction code is "0", it indicates that the present RFID chip is to be used with a closed RFID system, and the identification procedure is to be executed by the discrimination circuit. In this case, the discriminating circuit actuates the second circuit to transmit the product ID or tag series ID to the reader, and the reader transfers the information to the remote server. The remote server then searches a corresponding primitive checking code in the database according to the product ID or tag series ID. The primitive checking code is transmitted to the discriminating circuit via the reader. The discriminating circuit compares the primitive checking code with the identifying checking code newly obtained by the calculating circuit. If the two checking codes comply with each other under a specified product ID or tag series ID, the electronic label is successfully identified.

Figure 5:
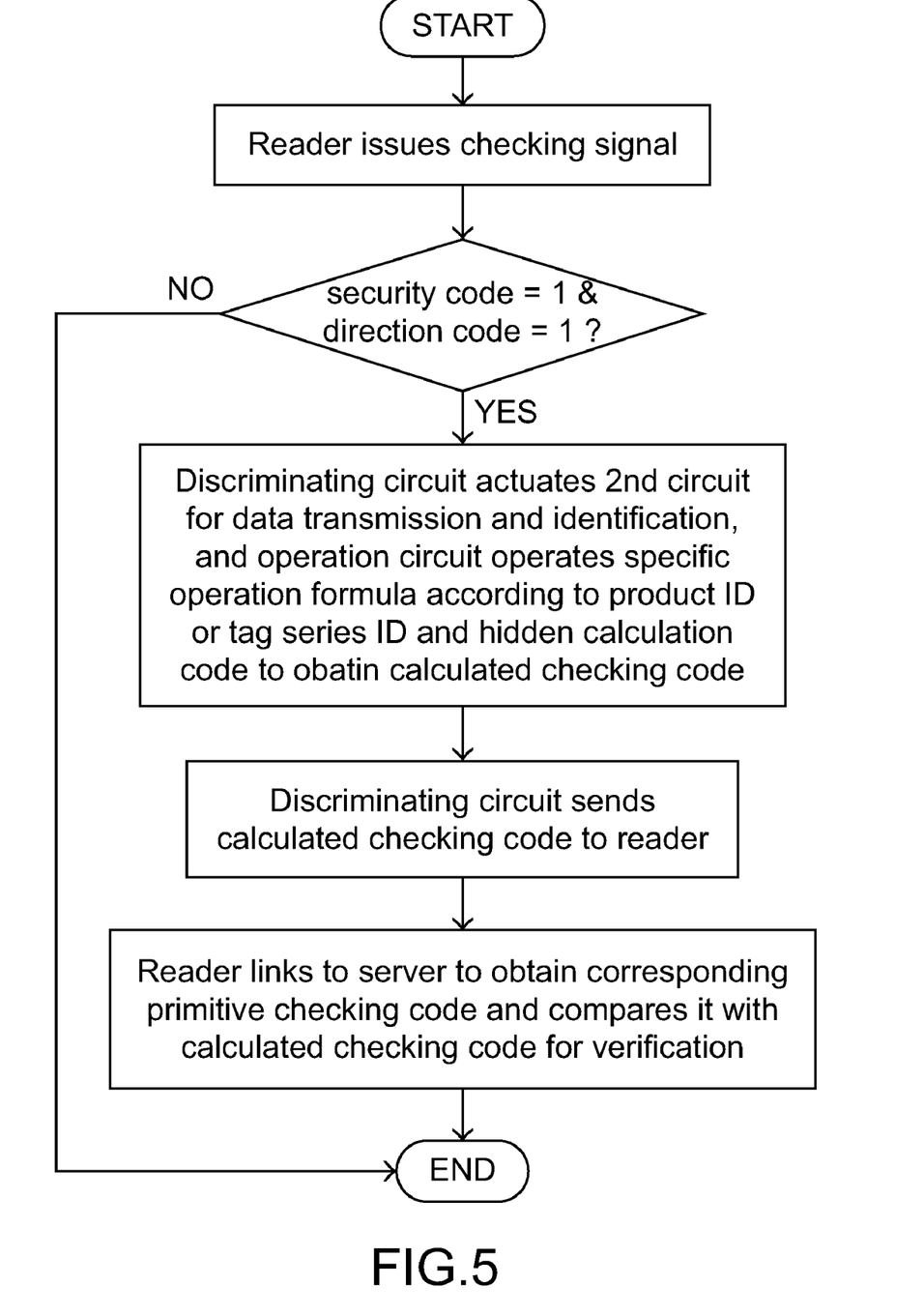
FIG. 5 is a flowchart illustrating an operating method of an RFID chip with an RFID system of FIG. 3 according to a third embodiment of the present invention.

FIG. 5 illustrates an identification procedure of an electronic label according to a third embodiment of the present invention. Likewise, before the identification procedure is performed, product ID as that stored in the product ID zone or tag series ID as that stored in the read-only chip maker zone of the RFID chip are stored into a database of the associated RFID system in advance. In addition, the primitive checking code is also generated and stored into the database. When the electronic label is used with a closed RFID system, the identification procedure as illustrated in FIG. 5 is performed. In response to a checking signal issued by a reader of the current RFID system, the discriminating circuit checks the security code and direction code of the RFID chip. If the security code is "1" and the direction code is "1", it indicates that the present RFID chip is to be used with a closed RFID system, and the identification procedure is to be executed by the reader. In this case, the discriminating circuit actuates the second circuit to transmit the identifying checking code newly obtained by the calculating circuit to the reader. The reader further realizes a corresponding primitive checking code by having the remote server search the database according to the product ID or tag series ID. The reader compares the primitive checking code with the identifying checking code. If the two checking codes comply with each other under a specified product ID or tag series ID, the electronic label is successfully identified.

Figure 6:
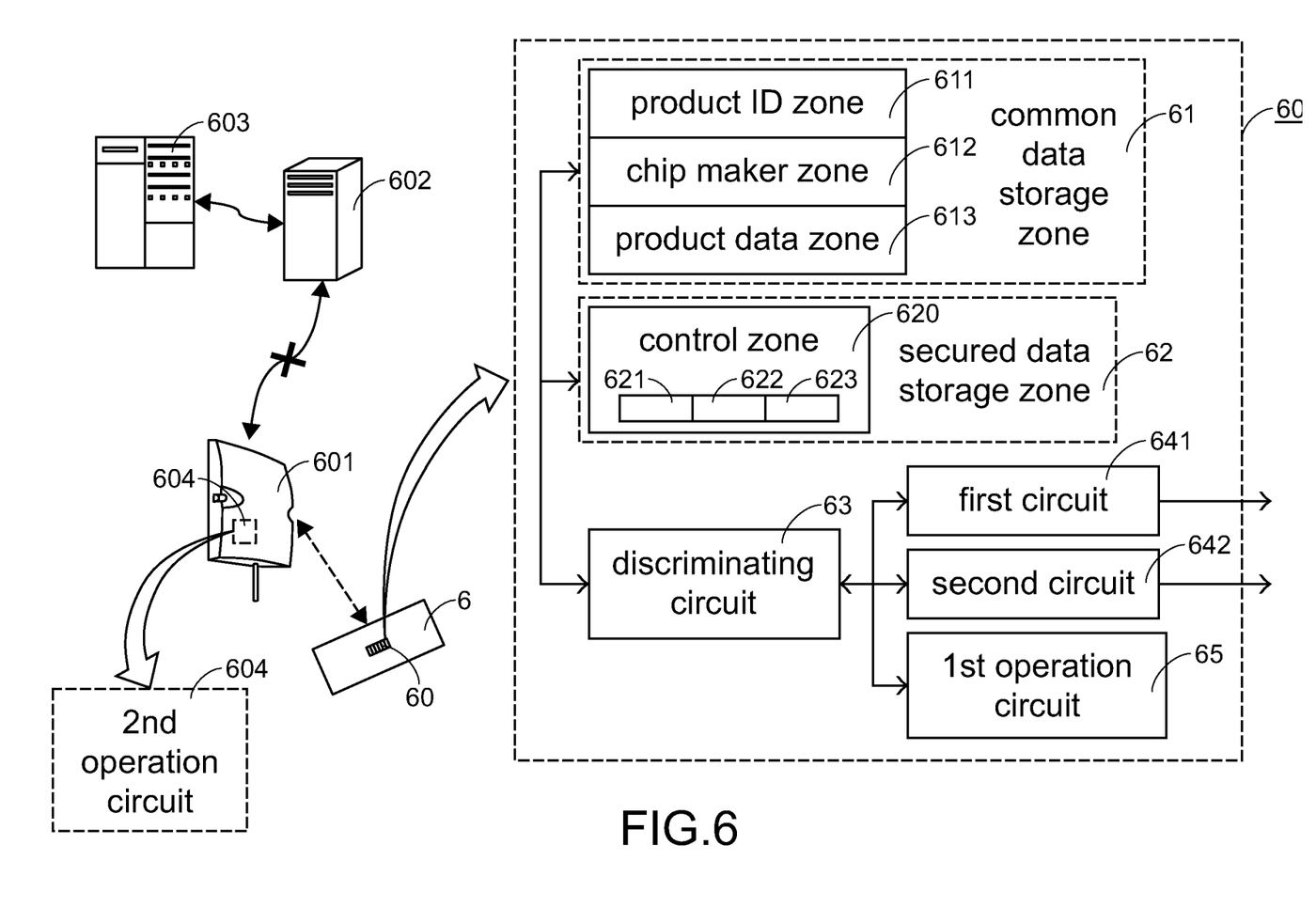
FIG. 6 is a schematic diagram illustrating an RFID chip used with an RFID system for identifying an RFID label according to another embodiment of the present invention.

Please refer to FIG. 6 which is a schematic diagram showing means for identifying an electronic label according to an embodiment of the present invention, including an RFID chip and an closed RFID system with which the electronic label is currently used (hereinafter, "the current RFID system"). In this RFID system, the reader 601 is not connected to the database 603. Therefore, there is no primitive checking code previously stored to be referred for identification. Instead, the reader 601 is disposed therein a calculating circuit. In other words, there are two calculating circuits, i.e. a first calculating circuit 65 disposed in the RFID chip 60 and a second calculating circuit 604 disposed in the reader 601, involved. In the RFID chip 60, the first calculating circuit 65 performs a first checking-code operation of production ID or tag series ID and a random value generated based on the calculation code 623 according to a first operation formula. Accordingly, a first identifying checking code is obtained. Meanwhile, the production ID or tag series ID and random value generated based on the calculation code 623 are also provided for the reader 601 by the discriminating circuit 63 to perform a second checking-code operation by the second calculating circuit 604, thereby obtaining a second checking code. Once a certain correlation of the first identifying checking code to the second identifying checking code is satisfied, e.g. the first checking code is equal to the second checking code when the first operation formula is identical to the second operation formula, the electronic label is successfully identified.

It is understood that the logic operation formula is preferably set by the chip maker and kept as a secret for security. If the reader 601 and the electronic label 6 are not a valid pair, the first operation formula may not be identical to the second operation formula. Thus the identification of the electronic label fails because the first identifying checking code and the second identifying checking code are not equal to each other.

Hereinafter, without liking to the database 603, an example of the use of an RFID chip with security code "1" and direction code "0" and an example of the use of a RFID chip with security code "1" and direction code "1" are illustrated.

Figure 7:
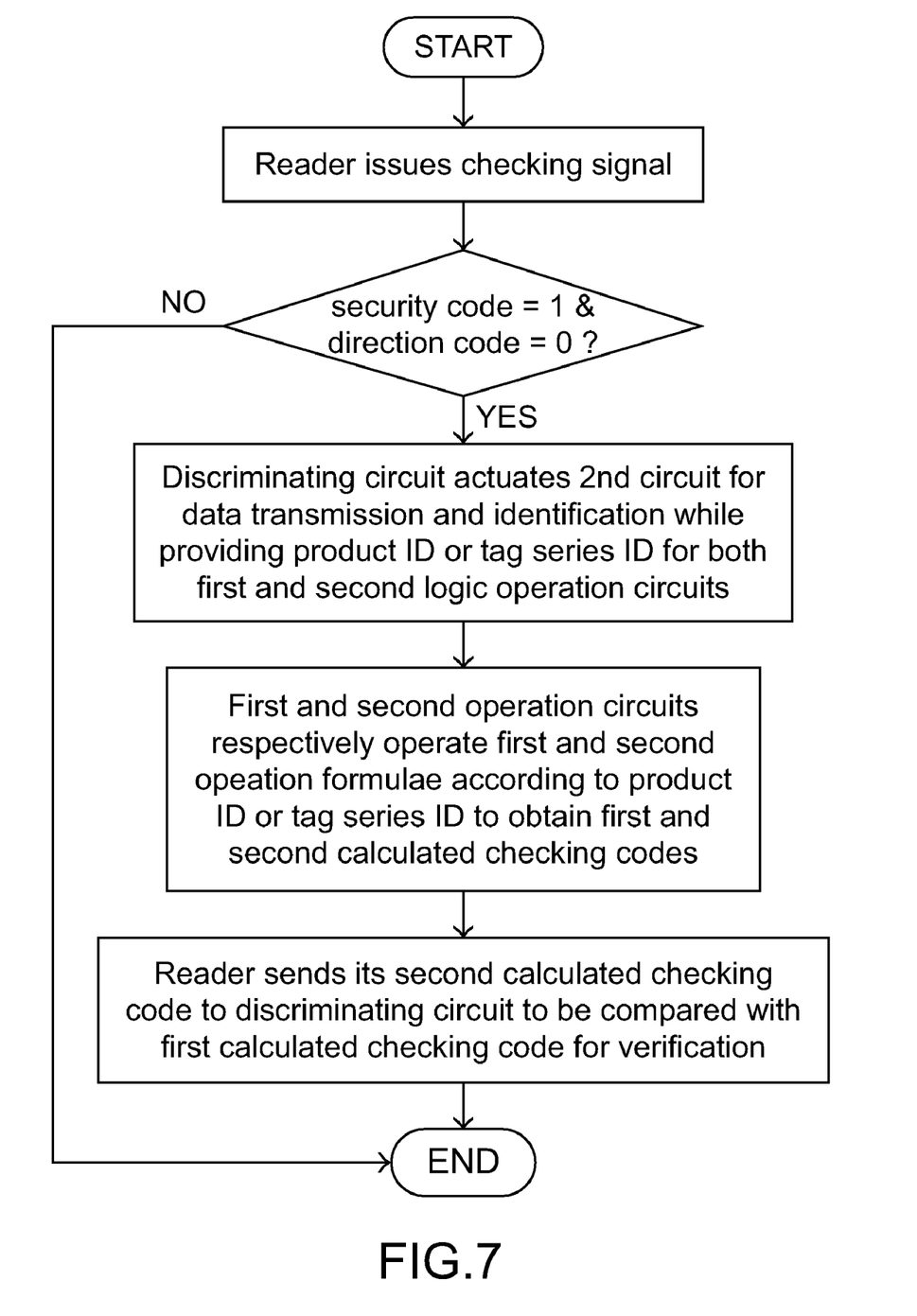
FIG. 7 is a flowchart illustrating an operating method of an RFID chip with an RFID system of FIG. 6 according to an embodiment of the present invention.

Refer to the flowchart of FIG. 7. If the security code 621 is "1" and the direction code 622 is "0", the comparison of the first identifying checking code with the second identifying checking code is performed by the RFID chip 60. In other words, both the first calculating circuit 65 and the second calculating circuit 604 perform calculation of checking codes based on the same data with respective operation formulae. The discriminating circuit actuates the second circuit 642 to transmit the product ID or tag series ID to the reader 601 for calculating the second checking code. Afterwards, the reader 601 transmits the second checking code calculated by the second calculating circuit 604 to the RFID chip 60 to be compared with the first checking code calculated by the first calculating circuit 65. Once the two checking codes comply with each, the electronic label 6 is successfully identified.

Figure 8:
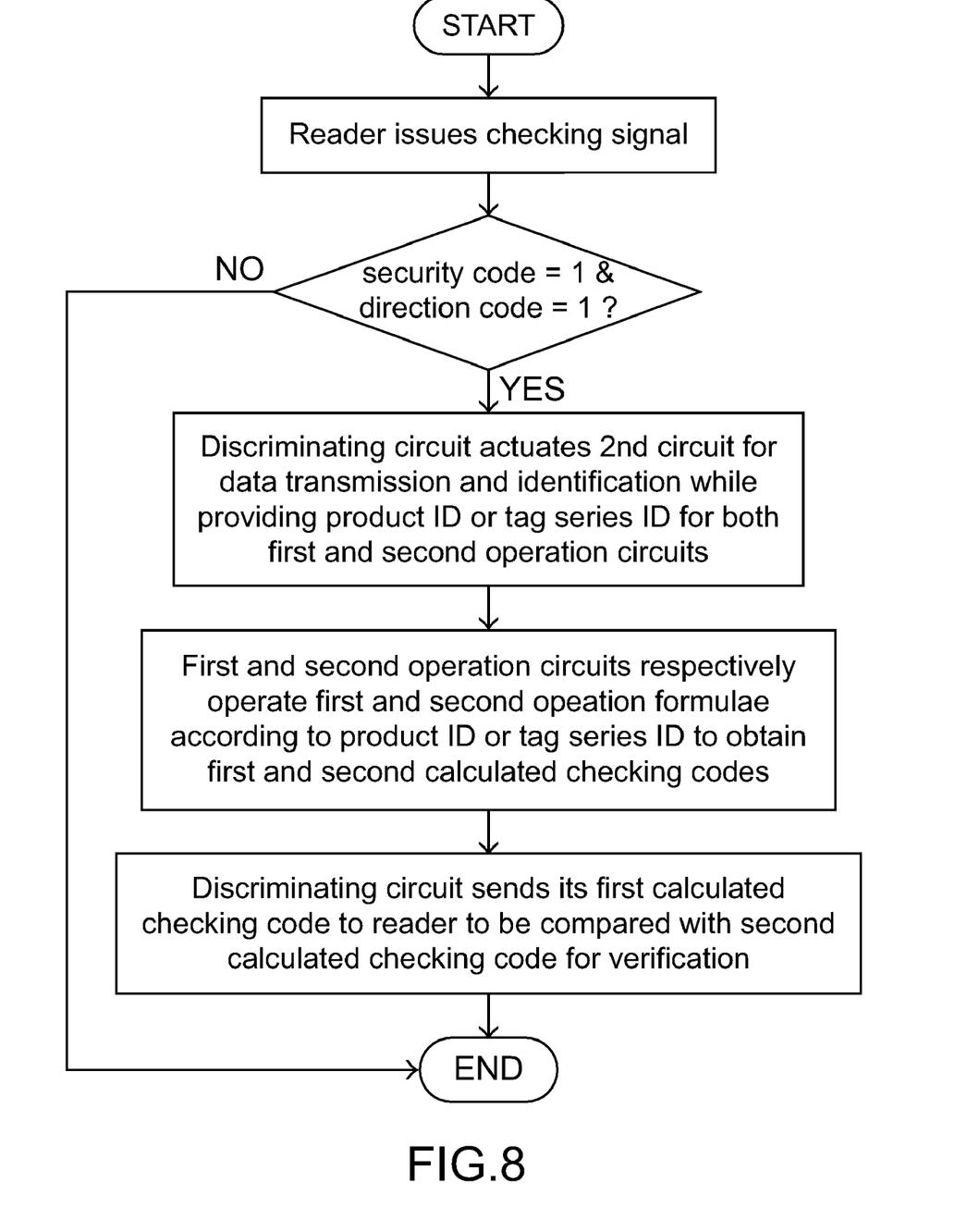
FIG. 8 is a flowchart illustrating an operating method of an RFID chip with an RFID system of FIG. 6 according to another embodiment of the present invention.

Refer to the flowchart of FIG. 8. If the security code 621 is "1" and the direction code 622 is "1", the comparison of the first identifying checking code with the second identifying checking code is performed by the reader 601. In other words, both the first calculating circuit 65 and the second calculating circuit 604 perform calculation of checking codes based on the same data with respective operation formulae. The discriminating circuit actuates the second circuit 642 to transmit the product ID or tag series ID to the reader 601 for calculating the second checking code. In addition, the discriminating transmits the first checking code obtained by the first calculating circuit 65 to the reader 601 via the second circuit 642. Afterwards, the reader 601 compares the first checking code with the second checking code. Once the two checking codes comply with each, the electronic label 6 is successfully identified.

In this embodiment, since an additional calculating circuit 604 is disposed in the reader 601, the calculation code 623 is not needed and thus can be floating or set as a constant.

In view of the foregoing, it is understood that an electronic label with an RFID chip according to the present invention can be flexibly used in various RFID systems, closed or open, by providing enough circuitry required for data transmission and identification in these systems, and using different codes, e.g. security code, direction code and calculation code, in the control zone to distinguish and differentially operate the systems. In addition, with the specific operation mechanism, fake readers or electronic labels can be screened out. Furthermore, by constraining access and forbidding modification of the control codes and the logic operation formula, which for example can be provided by the chip maker, the reliability of the systems can be further confirmed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An RFID (radio frequency identification) chip to be disposed in an electronic label, the RFID chip being modifiable to allow the electronic label to be selectively used with a first type of RFID system or a second type of RFID system, and comprising:
   a first data storage zone for storing first data set which can be read by the first type of RFID system and the second type of RFID system; and
   a second data storage zone for storing second data set which cannot be read by the first type of RFID system and the second type of RFID system;
   wherein the second data set includes a modifiable code for indicating with which of the first type of RFID system and the second type of RFID system the electronic label is to be used.

2. The RFID chip according to claim 1 further comprising:
   a first circuit for communicating with the first type of RFID system;
   a second circuit for communicating with the second type of RFID system; and
   a discriminating circuit for actuating one of the first type of RFID system and the second type of RFID system according to the modifiable code included in the second data set.

3. The RFID chip according to claim 2 further comprising a calculating circuit for obtaining a checking code according to a first data included in the first data set and a second data included in the second data set.

4. The RFID chip according to claim 3 wherein a primitive checking code is obtained by the calculating circuit and previously stored into a database of the second type of RFID system with which the electronic label is to be used.

5. The RFID chip according to claim 4 wherein an identifying checking code is obtained by the calculating circuit and compared with the primitive checking code stored during an identification procedure of the electronic label.

6. The RFID chip according to claim 5 wherein the comparison of the identifying checking code and the primitive checking code is performed by the discriminating circuit.

7. The RFID chip according to claim 5 wherein the comparison of the identifying checking code and the primitive checking code is performed by a reader of the second type of RFID system, which is coupled to the database of the second type of RFID system.

8. The RFID chip according to claim 3 wherein the first data is a product ID or a tag series ID, the second data is a calculation code.

9. The RFID chip according to claim 3 wherein the second type of RFID system comprises an additional calculation circuit for obtaining an additional checking code, the additional checking code and the checking code are compared during an identification procedure of the electronic label.

10. The RFID chip according to claim 9 wherein the comparison of the additional checking code and the checking code is performed by the discriminating circuit.

11. The RFID chip according to claim 9 wherein the comparison of the additional checking code and the checking code is performed by a reader of the second type of RFID system, which is disposed therein the additional calculation circuit.

12. The RFID chip according to claim 1 wherein the first circuit is actuated by the discriminating circuit when the modifiable code included in the second data set is a first value, and the second circuit is actuated by the discriminating circuit when the modifiable code included in the second data set is a second value.

13. The RFID chip according to claim 12 wherein the second data set further includes a direction code, and the discriminating circuit transmits a identifying checking code to an RFID system with which the electronic label is currently used when the direction code is a third value, and receives a primitive checking code from the RFID system when the direction code is a fourth value.

14. The RFID chip according to claim 1 wherein the first data set includes a product ID, a tag series ID and a server IP.

15. A setting method of an RFID chip to be disposed in an electronic label which is selectively used with a first type of RFID system or a second type of RFID system, comprising:
    storing a first data set in a first data storage zone of the RFID chip, wherein the first data storage can be read by the first type of RFID system and the second type of RFID system;
    storing a second data set in a second data storage zone of the RFID chip, wherein the second data storage zone cannot be read by the first type of RFID system and the second type of RFID system; and
    modifying a modifiable code included in the second data set depending on which type of RFID system the electronic label is to be used with.

16. The setting method of claim 15 further comprising:
    modifying a direction code included in the second data set depending on whether an identification procedure of the electronic label is to be executed by the RFID chip or the RFID system the electronic label is to be used with.

17. An operating method of an RFID chip to be disposed in an electronic label, comprising:
    referring to a security code stored in a secured data storage zone of the RFID chip;
    selectively actuating a first circuit of the RFID chip when the security code indicates the RFID chip is to be used with a first type of RFID system; and
    selectively actuating a second circuit of the RFID chip when the security code indicates the RFID chip is to be used with a second type of RFID system;
    wherein the secured data storage zone cannot be read by the first type of RFID system and the second type of RFID system.

* * * * *